United States Patent
Yao

(10) Patent No.: US 8,571,253 B2
(45) Date of Patent: Oct. 29, 2013

(54) IMAGE QUALITY EVALUATION DEVICE AND METHOD

(75) Inventor: Hongjie Yao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 521 days.

(21) Appl. No.: 12/642,231

(22) Filed: Dec. 18, 2009

(65) Prior Publication Data

US 2010/0166302 A1  Jul. 1, 2010

(30) Foreign Application Priority Data

Dec. 26, 2008   (CN) ............... 2008 1 0187310

(51) Int. Cl.
*G06K 9/00* (2006.01)
*G06K 9/34* (2006.01)

(52) U.S. Cl.
USPC ..................... 382/100; 382/162; 382/164

(58) Field of Classification Search
USPC ................................................ 382/100, 162
See application file for complete search history.

(56) References Cited

U.S. PATENT DOCUMENTS

| | | | |
|---|---|---|---|
| 5,140,418 A * | 8/1992 | Rivamonte | 348/185 |
| 7,362,354 B2 * | 4/2008 | Lin | 348/222.1 |
| 7,680,343 B2 * | 3/2010 | Covell et al. | 382/224 |
| 7,693,304 B2 * | 4/2010 | Obrador | 382/112 |
| 7,865,023 B2 * | 1/2011 | Takahashi | 382/232 |
| 7,873,231 B2 * | 1/2011 | Bouk et al. | 382/254 |
| 7,920,727 B2 * | 4/2011 | Weng et al. | 382/118 |
| 8,081,227 B1 * | 12/2011 | Kim et al. | 348/211.3 |
| 8,126,197 B2 * | 2/2012 | Jones et al. | 382/100 |
| 8,230,103 B2 * | 7/2012 | Henry et al. | 709/232 |
| 8,401,258 B2 * | 3/2013 | Hargrove et al. | 382/128 |

(Continued)

FOREIGN PATENT DOCUMENTS

| | | | |
|---|---|---|---|
| CN | 1725840 A | 1/2006 | |
| JP | 2002156338 A * | 5/2002 | G01N 21/90 |

(Continued)

OTHER PUBLICATIONS

European Extended Search Report dated (mailed) Oct. 6, 2010, for application No. 09179632.6-1522, Huawei Technologies Co., Ltd (5 pages).

First Office Action of the State Intellectual Property Office of the PRC for Application No. 200810187310.3, dated Jan. 8, 2010, 5 pgs., English translation attached.

(Continued)

*Primary Examiner* — Utpal Shah
(74) *Attorney, Agent, or Firm* — Conley Rose, P.C.; Grant Rodolph; Rayhao Chung

(57) ABSTRACT

An image quality evaluation device is disclosed in the present invention, including: an image analyzer, adapted to analyze the parameters of an image to obtain parameter values; and an evaluation unit, adapted to evaluate the quality of an image based on parameter values in line with the predetermined standard and generate the evaluation result. An image quality evaluation method is disclosed in the present invention, including: analyze the parameters of an image to obtain parameter values; and evaluate the quality of an image based on parameter values in line with the predetermined standard and generate the evaluation result. An image quality evaluation device and method provided in the present invention are used to analyze the parameters of an image with the image recognition technology to obtain parameter values and then generate the parameter values in line with the predetermined standard. In this way, the photo quality can be evaluated automatically in the present invention to decrease the exhausted manpower and improve the entertainment function.

8 Claims, 2 Drawing Sheets

(56) References Cited

U.S. PATENT DOCUMENTS

| | | | |
|---|---|---|---|
| 2006/0017820 A1* | 1/2006 | Kim | 348/231.2 |
| 2006/0056835 A1* | 3/2006 | Poon et al. | 396/310 |
| 2006/0188170 A1* | 8/2006 | Kanda et al. | 382/255 |
| 2007/0230823 A1* | 10/2007 | Weng et al. | 382/286 |

FOREIGN PATENT DOCUMENTS

| | | |
|---|---|---|
| JP | 2003-087442 | 3/2003 |
| JP | 2004-280597 | 10/2004 |
| JP | 2006-171840 | 6/2006 |
| JP | 2007158868 | 6/2007 |
| JP | 2007158868 A | 6/2007 |
| JP | 2008-083892 | 4/2008 |
| JP | 2008-198086 | 8/2008 |
| KR | 10-2006-008135 | 1/2006 |

OTHER PUBLICATIONS

European Patent Office Communication pursuant to Article 94(3) EPC, European search opinion for Application No. 09179632.6, mailed Jun. 14, 2011, Huawei Device Co., Ltd. (6 pgs.).

Korean Intellectual Property Office Notice to Submit a Response, pursuant to Article 63 of the Patent Act, Korean Application No. 10-2009-0126837, Huawei Device Co., Ltd. (5 pgs.), 2011.

Office Action of the Japanese Patent Office of related JP Application No. 2009-297359, dated Nov. 4, 2011, English translation attached.

Foreign Communication from a Counterpart Application, European Application 09179632.6, European Office Action dated Feb. 1, 2013, 4 pages.

Foreign Communication From a Counterpart Application, European Application 09179632.6, European Office Action dated Jun. 21, 2013, 6 pages.

* cited by examiner

IMAGE QUALITY EVALUATION DEVICE AND METHOD

CROSS-REFERENCE TO RELATED APPLICATION

This application claims priority to Chinese Patent Application No. 200810187310.3, filed on Dec. 26, 2008, which is hereby incorporated by reference in its entirety.

FIELD OF THE INVENTION

The present invention relates to a digital image processing field, and in particular, to an image quality evaluation device and method.

BACKGROUND

At present, digital products have been widely used in all aspects of people's lives, where digital cameras are indispensable companions at a party or during people's tour. When photos are taken by a digital camera, various reasons may cause poor quality of these photos, such as color overload, red eye of a person, overexposure, bad layout and/or poor definition. Therefore, some photos may become condemned photos. In the process of implementing an embodiment of the present invention, the inventor, however, finds that the existing technology at least has the following problems: Photos of good quality and poor quality can be distinguished only through manual selection, and the people are greatly inconvenienced by a number of photos for selection. That is, photo quality cannot be evaluated with the existing technology.

SUMMARY

The technical problem to be solved herein is that an image quality evaluation device and method are provided to automatically evaluate the quality of photos.

An image quality evaluation device is provided herein to solve the preceding technical problem. The device includes:
an image analyzer, adapted to analyze the parameters of an image to obtain parameter values; and
an evaluation unit, adapted to evaluate the quality of an image based on parameter values in line with the predetermined standard, and generate the evaluation result.

An image quality evaluation method is provided in an embodiment of the present invention. The method includes:
analyzing the parameters of an image to obtain parameter values; and
performing quality evaluation based on parameter values in line with the predetermined standard and generating the evaluation result.

The following good effect is obtained in an embodiment of the present invention: The photo quality can be evaluated by analyzing the parameters of an image to obtain parameter values, and then evaluating the quality of the image based on the parameter values in line with the predetermined standard to decrease the exhausted manpower.

DETAILED DESCRIPTION

The following section describes the embodiments of the present invention in detail in combination with the drawings.

Figure 1:
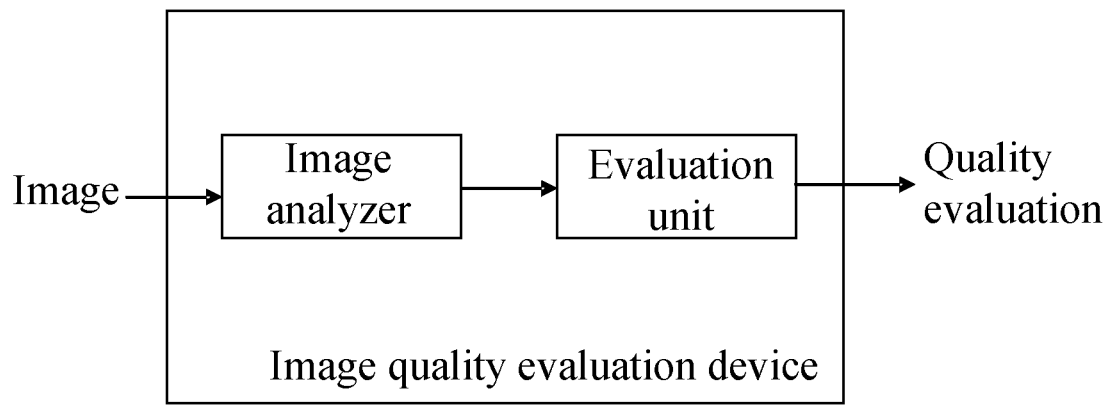
FIG. 1 shows the flow chart of an image quality evaluation device provided in an embodiment of the present invention.

FIG. 1 shows the flow chart of an image quality evaluation device provided in an embodiment of the present invention. As shown in FIG. 1, the image quality evaluation device includes:
an image analyzer, adapted to analyze the parameters of an image to obtain parameter values; and
an evaluation unit, adapted to evaluate the quality of an image based on parameter values in line with the predetermined standard, and generate the evaluation result.

In the embodiment, the image analyzer includes at least one analyzer of the color analyzer, position analyzer, layout analyzer, precision analyzer, and definition analyzer, respectively adapted to analyze the color, person position, layout, precision, and definition of an image to obtain the relevant parameter values. Correspondingly, the evaluation unit includes at least one evaluation unit of the color evaluation unit, position evaluation unit, layout evaluation unit, precision evaluation unit, and definition evaluation unit, respectively adapted to analyze the parameter values of color, person position, layout, precision, and definition of an image to generate the relevant evaluation result.

For example, an image analyzer can be a color analyzer, and an evaluation unit can be a color evaluation unit correspondingly. In this case, the color analyzer can be used to analyze the color of an image with the image recognition technology and generate the parameter values of color, such as the color quantity and color range of the image, white balance, and the parameter indicating whether a person has red eyes. Correspondingly, the color evaluation unit can be used to evaluate the quality of an image on the basis of the parameters of color output by the color analyzer. For example, we deem that the quality of an image is poor when the color quantity is too much due to color overload, when the color range is too narrow or too wide, when the color is unitary or distributed evenly, when the white balance effect is not good, or when a person in the image has red eyes. Reversely, we deem that the quality of an image is good when the color quantity is suitable, when the color range is harmonious, when white balance is used well, or when no person has red eyes. One or more preceding parameter values of color can be used to evaluate the color of an image.

An image analyzer can be a position analyzer. An evaluation unit can be a position evaluation unit correspondingly. The position analyzer analyzes the position of scenes and/or people in a photo to generate the relevant result. The position refers to the position of scenes or people in an image with the image recognition technology, or the position of people relative to scenes. The position evaluation unit is used to evaluate the position on the basis of the parameter values generated by a position analyzer in line with the predetermined standard for position evaluation. For example, we deem that the position of a person in an image is bad when the person is located to one side or in the middle. We deem that the position is good when the person is located suitably in the image. The method for evaluating the position of scenes is similar to the method for evaluating the position of people.

An image analyzer can be a layout analyzer. An evaluation unit can be a layout evaluation unit correspondingly. The layout analyzer can be used to analyze the layout of an image with the image recognition technology, and then the layout evaluation unit can be used to evaluate the difference between the image and typical layout according to the standard of several predetermined typical layout schemes. For example, we deem that the layout of an image is bad when the layout of the image is based on a rectangular pattern but the typical layout is in a triangle pattern.

An image analyzer can be a definition analyzer. An evaluation unit can be a definition evaluation unit correspondingly. The definition analyzer is used to analyze the definition of an image by obtaining the boundary or outline of scenes, people, and other objects in the image with the image recognition technology. Subsequently, the definition evaluation unit can be used to evaluate the difference between the definition of the image and the predetermined standard definition value. For example, we deem that the quality of an image is good if the result output by a definition analyzer shows that the grey scale value between the predetermined number of pixels and adjacent pixels in the image is higher than the standard definition value, that is, the predetermined pixel grey difference. Conversely, we deem that the quality of the image is poor. The definition analyzer is used to analyze the definition of a photo, that is, whether the boundary of the photo is recognizable, and recognize the fuzzy image caused by vibration of hands when the photo is taken.

An image analyzer can be a precision analyzer. An evaluation unit can be a precision evaluation unit correspondingly. The precision analyzer is used to distinguish the precision of an image, that is, the number of pixels of the image. Subsequently, the precision evaluation unit evaluates the precision of the image output by the precision analyzer on the basis of the predetermined standard precision value. For example, we deem that the precision of an image is good if the precision is 5 megabits and the precision of the image is bad if the precision is 1 megabit when the standard precision value is 3 megabits.

In the preceding contents, the evaluation unit makes only good or bad evaluation. Those skilled in the art should understand that the parameters output by the image analyzer can be evaluated in more levels if the standard values of different levels are set by the evaluation unit. For example, the qualitative evaluation can be given, such as 3-level evaluation covering good, fair, and poor levels, or 5-level evaluation covering excellent, good, fair, poor, terrible levels; the quantitative evaluation can also be given, such as 5-point, 10-point, or 100-point evaluation. The more the evaluation levels, the more precise the evaluation.

Figure 2:
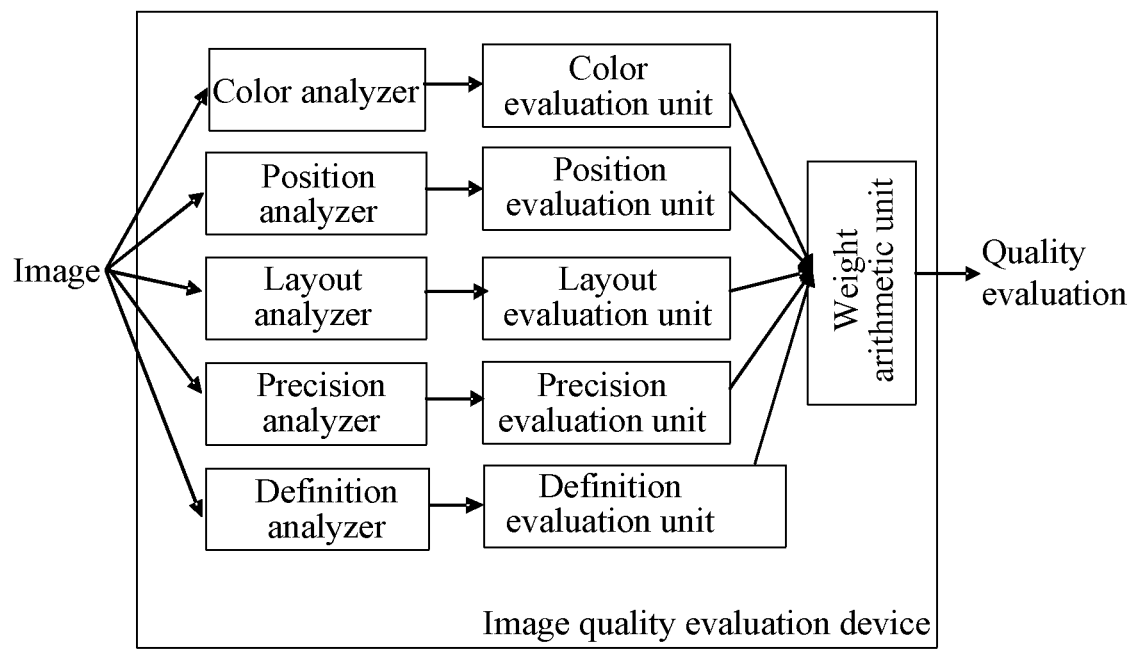
FIG. 2 shows the flow chart of an image quality evaluation device provided in another embodiment of the present invention.

In the preceding contents, only an image analyzer and a corresponding evaluation unit are provided in an embodiment. In the actual application, however, more image analyzers can be used as required, that is, several analyzers including a color analyzer, a position analyzer, a layout analyzer, a definition analyzer, and a precision analyzer can be used, such as, a color analyzer and a position analyzer, or a color analyzer, a position analyzer, and a layout analyzer, or a position analyzer, a layout analyzer, and a definition analyzer are used. In another embodiment of the present invention where an image quality evaluation device is provided, as shown in FIG. 2, the image analyzer includes a color analyzer, a position analyzer, a layout analyzer, a definition analyzer, and a precision analyzer, as well as the corresponding color evaluation unit, position evaluation unit, layout evaluation unit, precision evaluation unit, and definition evaluation unit. In this way, different evaluation units can be used to provide evaluation values of different parameters.

In addition, in another embodiment of the present invention where an image quality evaluation device is provided, as shown in FIG. 2, a weight arithmetic unit can also be included. When different evaluation units provide the numerical evaluation results in uniform point scale, the results can be calculated according to the predetermined weight, and a weighted calculation result is generated as a comprehensive evaluation value. For example, in 100-point scale mode, if the color evaluation unit, position evaluation unit, layout evaluation unit, precision evaluation unit, and definition evaluation unit output the results of 85, 70, 93, 88, and 86 respectively, and the weight of each evaluation value is 0.3, 0.1, 0.2, 0.2, and 0.2, then the comprehensive evaluation value is 85×0.3+70×0.1+0.2×(93+88+86)=85.9. The weight as only a schematic weight can be set as required.

Figure 3:
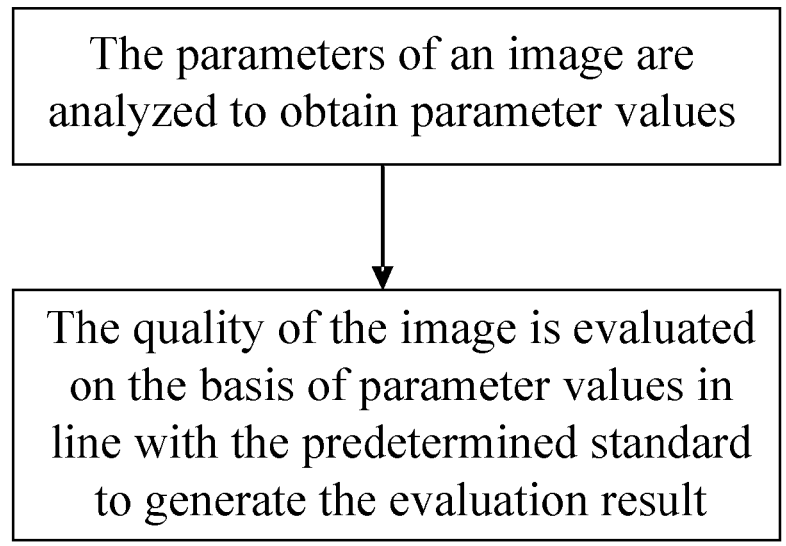
FIG. 3 shows the flow chart of an image quality evaluation method provided in an embodiment of the present invention.

FIG. 3 shows the flow chart of an image quality evaluation method provided in an embodiment of the present invention. As shown in FIG. 3, the image quality evaluation method includes:

analyzing the parameters of an image to obtain parameter values; and performing quality evaluation based on parameter values in line with the predetermined standard and generating the evaluation result.

At least one of parameters involving color, position, layout, precision, and definition of an image can be analyzed. At least one aspect of the quality involving color, position, layout, precision, and definition of an image can be evaluated on the basis of the parameter values in line with the predetermined standard. Because the preceding image analysis process and evaluation process have been described in the sections related to the image analyzer and the evaluation unit, no more details are given here.

The result that is obtained in each evaluation step can be qualitative or quantitative evaluation result, which has been described in the preceding section.

In addition, the step for performing weighted calculation of the generated quantitative evaluation result according to the predetermined weight can also be included. The effect for the step is similar to the effect for the weight arithmetic unit. Therefore, no more details are given here.

Figure 4:
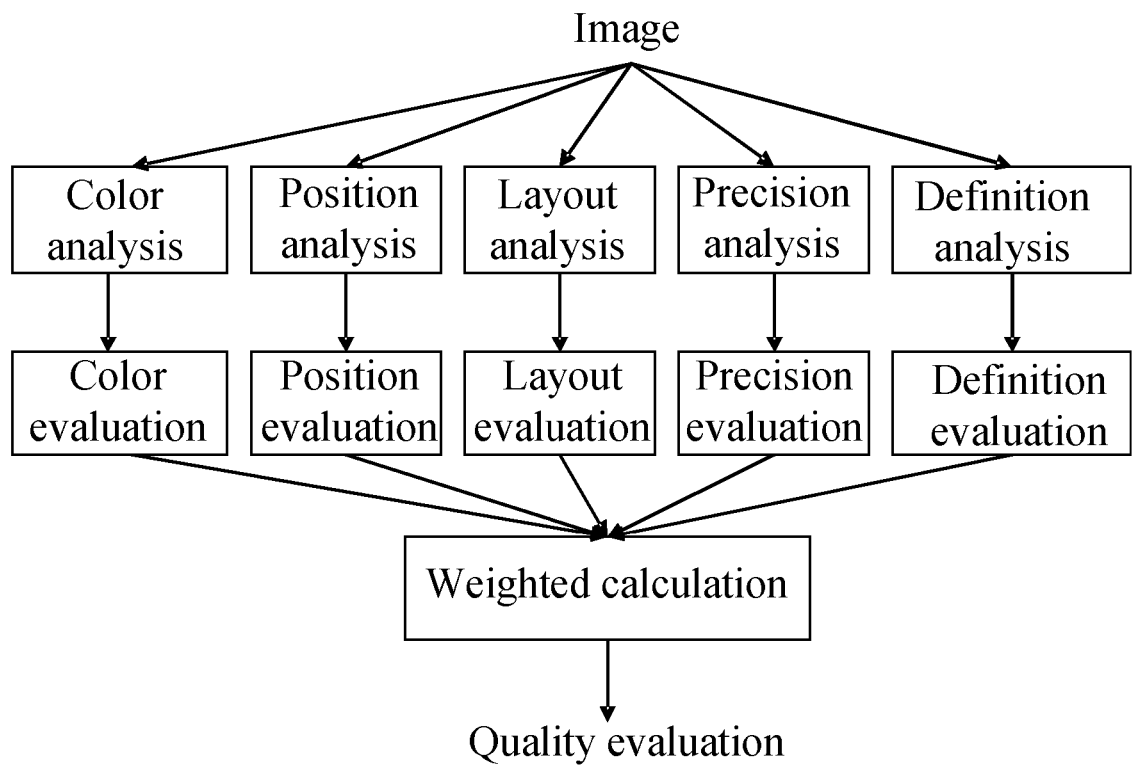
FIG. 4 shows the flow chart of an image quality evaluation method provided in another embodiment of the present invention.

FIG. 4 shows the flow chart of an image quality evaluation method provided in another embodiment of the present invention. As shown in FIG. 4, the procedures for analyzing the parameters involving color, position, layout, precision, and definition of an image are included. The procedures for evaluating the quality involving color, position, layout, precision, and definition of an image according to the parameter values in line with the predetermined standard are also included. In addition, the procedure for obtaining the weight calculation result as the comprehensive evaluation result is included. The result is obtained by performing weighted calculation of values in uniform point scale that are output in the evaluation step according to the predetermined weight. The method can be used to automatically perform comprehensive analysis and evaluation of color, position, layout, precision, and definition of an image to obtain a comprehensive evaluation value of the image.

The image processed in the present invention can be a digital photo, video data, or another digital image. An image quality evaluation device provided in an embodiment of the present invention can be an independent product but is not limited to a digital camera, a camera phone, a digital phone frame, or components of these products. The device is protected by the present invention if only the device provided in an embodiment of the present invention has basic components. The present invention can be used to automatically obtain quality evaluation of an image, and can provide the qualitative reference comments about the quality of the image. Furthermore, multiple images can be scored to provide quantitative evaluation comments. In this way, the entertainment function is available for a user, so that the user evaluates the photo that is taken by himself or others for delight.

The preceding embodiments are only used as instances of the present invention, and not used to limit the present invention. The protection scope of the present invention is determined in the appended claims. Those skilled in the art can make modification or equivalent replacement of the present invention in the essential protection range of the present invention. All the modification or equivalent replacement are protected by the present invention.

The invention claimed is:

1. An image quality evaluation device, comprising:
an image analyzer configured to analyze parameters of an image to obtain parameter values; and
an evaluation unit configured to evaluate quality of the image based on the parameter values according to a predetermined standard and generate an evaluation result,
wherein the image analyzer comprises a precision analyzer configured to obtain a precision of the image,
wherein the precision of the image comprises an amount of pixels in the image,
wherein the evaluation unit comprises a precision evaluation unit configured to evaluate the precision of the image by comparing the precision obtained by the precision analyzer to a predetermined standard precision value,
wherein the predetermined standard precision value comprises a preset amount of pixels, and
wherein the evaluation unit is configured to:
compare the amount of pixels in the image to the preset amount of pixels to determine whether the amount of pixels in the image is greater than or less than the preset amount of pixels;
determine that the quality of the image is acceptable when the amount of pixels in the image is greater than the preset amount of pixels; and
determine that the quality of the image is unacceptable when the amount of pixels in the image is less than the preset amount of pixels.

2. The image quality evaluation device according to claim 1, wherein the image analyzer further comprises at least one of: a color analyzer, a position analyzer, a layout analyzer, and a definition analyzer, wherein each analyzer is respectively configured to analyze a color, a person position, a layout, and a definition of the image to obtain the respective parameter values, wherein the evaluation unit further comprises at least one of: a color evaluation unit, a position evaluation unit, a layout evaluation unit, and a definition evaluation unit, and wherein each evaluation unit is respectively configured to evaluate the parameter values of the color, the person position, the layout, and the definition of the image to generate the respective evaluation results.

3. The image quality evaluation device according to claim 2, wherein the evaluation result generated by each evaluation unit includes numerical values that are determined by a uniform point scale.

4. The image quality evaluation device according to claim 3, further comprising a weight arithmetic unit configured to calculate the numerical values generated by each evaluation unit in the uniform point scale according to a predetermined weight, and generate a weighted calculation result as a comprehensive evaluation result.

5. An image quality evaluation method, comprising:
analyzing parameters of an image to obtain parameter values;
evaluating a quality of the image based on the parameter values according to a predetermined standard; and
generating an evaluation result,
wherein analyzing the parameters of the image includes obtaining a precision of the image,
wherein the precision of the image comprises an amount of pixels in the image,
wherein evaluating the quality of the image includes evaluating the precision of the image by comparing the precision of the image to a predetermined standard precision value,
wherein the predetermined standard precision value comprises a preset amount of pixels, and
wherein evaluating the quality of the image comprises:
comparing the amount of pixels in the image to the preset amount of pixels to determine whether the amount of pixels in the image is greater than or less than the preset amount of pixels;
determining that the quality of the image is acceptable when the amount of pixels in the image is greater than the preset amount of pixels; and
determining that the quality of the image is unacceptable when the amount of pixels in the image is less than the preset amount of pixels.

6. The image quality evaluation method according to claim 5, wherein analyzing the parameters of the image further includes at least one of: a color analysis, a position analysis, a layout analysis, and a definition analysis, wherein each analysis is respectively related to analyzing a color, a person position, a layout, and a definition, to obtain the respective parameter values, wherein evaluating the quality of the image further includes at least one of: a color evaluation, a position evaluation, a layout evaluation, and a definition evaluation, and wherein each evaluation is respectively related to evaluating the parameter values of the color, the person position, the layout, and the definition of the image, and generating the respective evaluation results.

7. The image quality evaluation method according to claim 6, wherein the evaluation result generated in each type of evaluation includes numerical values determined by a uniform point scale.

8. The image quality evaluation method according to claim 7, further comprising calculating the numerical values generated in each type of evaluation in the uniform point scale according to a predetermined weight, and generating a weighted calculation result as a comprehensive evaluation result.

* * * * *